United States Patent
Ohta et al.

(10) Patent No.: US 11,523,455 B2
(45) Date of Patent: Dec. 6, 2022

(54) WIRELESS COMMUNICATION SYSTEM, BASE STATION, MOBILE STATION, AND METHOD OF WIRELESS COMMUNICATION

(71) Applicant: FUJITSU LIMITED, Kawasaki (JP)

(72) Inventors: Yoshiaki Ohta, Yokohama (JP); Yoshihiro Kawasaki, Kawasaki (JP); takayoshi Ode, Yokohama (JP); Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/018,823

(22) Filed: Sep. 11, 2020

(65) Prior Publication Data

US 2020/0413471 A1 Dec. 31, 2020

Related U.S. Application Data

(63) Continuation of application No. PCT/JP2018/010318, filed on Mar. 15, 2018.

(51) Int. Cl.
*H04W 76/20* (2018.01)
*H04W 76/27* (2018.01)

(52) U.S. Cl.
CPC .................................. *H04W 76/20* (2018.02)

(58) Field of Classification Search
CPC . H04W 76/20; H04W 52/0206; H04W 76/34; H04W 76/10; H04W 74/0833; H04W 76/27; Y02D 30/70
See application file for complete search history.

(56) References Cited

U.S. PATENT DOCUMENTS

| 6,456,604 B1* | 9/2002 | Lee ........................ H04W 36/06 370/328 |
| 10,965,039 B1* | 3/2021 | Chandler .............. G01S 7/0231 |
| 2014/0023132 A1* | 1/2014 | Pandey ............. H04L 25/03885 375/232 |
| 2015/0043403 A1 | 2/2015 | Tarradell et al. |

(Continued)

FOREIGN PATENT DOCUMENTS

| JP | 2016-146661 A | 8/2016 |
| JP | 2016-527848 A | 9/2016 |
| WO | 2015/021284 A1 | 2/2015 |

OTHER PUBLICATIONS

Extended European search report with supplementary European search report and the European search opinion issued by the European Patent Office for corresponding European Patent Application No. 18909455.0-1231, dated Feb. 23, 2021.

(Continued)

*Primary Examiner* — Andrew Wendell
(74) *Attorney, Agent, or Firm* — Myers Wolin, LLC

(57) ABSTRACT

A base station includes a memory and a processor coupled to the memory and configured to transmit, when a state transition of a mobile station is performed, a first control signal to the mobile station, and perform control to simultaneously transmit the first control signal and a second control signal different from the first control signal to the mobile station when a first state transition, which causes a state of the mobile station to transfer from a first state to a second state, is performed, and then a second state transition, which causes the state of the mobile station to transfer from the second state to a third state, is performed.

11 Claims, 12 Drawing Sheets

(56) References Cited

U.S. PATENT DOCUMENTS

| | | | |
|---|---|---|---|
| 2015/0080006 A1 | 3/2015 | Ohta | |
| 2015/0099506 A1* | 4/2015 | Iwai | H04W 8/20 |
| | | | 455/419 |
| 2017/0325281 A1 | 11/2017 | Hong et al. | |
| 2017/0332362 A1* | 11/2017 | Li | H04W 72/12 |
| 2018/0220486 A1* | 8/2018 | Tseng | H04W 36/305 |
| 2019/0191483 A1* | 6/2019 | Ryoo | H04W 76/27 |
| 2020/0099432 A1* | 3/2020 | Määttanen | H04B 7/063 |
| 2021/0160946 A1* | 5/2021 | Oak | H04W 76/11 |
| 2022/0053448 A1* | 2/2022 | Velev | H04W 8/183 |
| 2022/0070759 A1* | 3/2022 | Wirth | H04W 88/10 |

OTHER PUBLICATIONS

ZTE, "Remaining issues for quick release of RRC connection in FeNB-IoT", Agenda Item: 9.13.6, 3GPP TSG-RAN WG2 Meeting #100, R2-1712329, Reno, Nevada, Nov. 27-Dec. 1, 2017.
3GPP TS 38.323 V2.0.0, "3rd Generation Partnership Project; Technical Specification Group Radio Access Network; NR; Packet Data Convergence Protocol (PDCP) specification, (Release 15)", Dec. 2017.
3GPP TS 38.331 V0.4.0, "3rd Generation Partnership Project Technical Specification Group Radio Access Network NR Radio Resource Control (RRC) Protocol specification, (Release 15)", Dec. 2017.
3GPP TS 38.401 V1.0.0, "3rd Generation Partnership Project; Technical Specification Group Radio Access Network; NG-RAN; Architecture description, (Release 15)", Dec. 2017.
3GPP TS 38.410 V0.6.0, "3rd Generation Partnership Project; Technical Specification Group Radio Access Network; NG-RAN; NG general aspect and principles, (Release 15)", Dec. 2017.
3GPP TS 38.413 V0.5.0, "3rd Generation Partnership Project; Technical Specification Group Radio Access Network; NG Radio Access Network (NG-RAN); NG Application Protocol (NGAP), (Release 15)", Dec. 2017.
3GPP TS 38.420 V0.5.0, "3rd Generation Partnership Project; Technical Specification Group Radio Access Network; NG-RAN; Xn general aspects and principles, (Release 15)", Dec. 2017.
3GPP TS 38.423 V0.5.0, "3rd Generation Partnership Project; Technical Specification Group Radio Access Network; NG Radio Access Network (NG-RAN); Xn application protocol (XnAP), (Release 15)", Dec. 2017.
3GPP TS 38.470 V1.0.0, "3rd Generation Partnership Project; Technical Specification Group Radio Access Network; NG-RAN; F1 general aspects and principles, (Release 15)", Dec. 2017.
3GPP TS 38.473 V1.0.0, "3rd Generation Partnership Project; Technical Specification Group Radio Access Network; NG-RAN; F1 application protocol (F1AP), (Release 15)", Dec. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.

3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
NTT Docomo, "New SID Proposal:Study on New Radio Access Technology", Agenda Item: 9.1, 3GPP TSG-RAN Meeting #71, RP-160671, Göteborg, Sweden, Mar. 7-Mar. 10, 2016.
3GPP TR 36.912 V16.0.0, "3rd Generation Partnership Project; Technical Specification Group Radio Access Network; Feasibility study for Further Advancements for E-UTRA (LTE-Advanced) (Release 16)", Jul. 2020.
Huawei et al., "UE behaviour upon leaving PRC_CONNECTED state", Agenda Item: 10.4.1.3.5, 3GPP TSG-RAN WG2 Meeting #101, R2-1803247, Athens, Greece, Feb. 26-Mar. 2, 2018.
Asustek, "State transition from RRC_CONNECTED to RRC_INACTIVE", Agenda Item: 10.4.1.3.5, 3GPP TSG-RAN WG2 Meeting #101, R2-1801895, Athens, Greece, Feb. 26-Mar. 2, 2018.
International Search Report and Written Opinion of the International Searching Authority issued by the Japan Patent Office for corresponding International Patent Application No. PCT/JP2018/010318, dated Jun. 5, 2018, with an English translation.
3GPP TS 36.211 V14.4.0, 3rd Generation Partnership Project; Technical Specification Group Radio Access Network; Evolved Universal Terrestrial Radio Access (E-UTRA); Physical channels and modulation (Release 14), Sep. 2017.
3GPP TS 36.212 V14.4.0, "3rd Generation Partnership Project; Technical Specification Group Radio Access Network; Evolved Universal Terrestrial Radio Access (E-UTRA); Multiplexing and channel coding, (Release 14)", Sep. 2017.
3GPP TS 36.213 V14.4.0, "3rd Generation Partnership Project; Technical Specification Group Radio Access Network; Evolved Universal Terrestrial Radio Access (E-UTRA); Physical layer procedures, (Release 14)", Sep. 2017.
3GPP TS 36.214 V14.4.0, "3rd Generation Partnership Project; Technical Specification Group Radio Access Network; Evolved Universal Terrestrial Radio Access (E-UTRA); Physical layer; Measurements, (Release 14)", Dec. 2017.
3GPP TS 36.300 V14.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;, (Release 14)", Sep. 2017.
3GPP TS 36.321 V14.4.0, "3rd Generation Partnership Project; Technical Specification Group Radio Access Network; Evolved Universal Terrestrial Radio Access (E-UTRA); Medium Access Control (MAC) protocol specification, (Release 14)", Sep. 2017.
3GPP TS 36.322 V14.1.0, "3rd Generation Partnership Project; Technical Specification Group Radio Access Network; Evolved Universal Terrestrial Radio Access (E-UTRA); Radio Link Control (RLC) protocol specification, (Release 14)", Sep. 2017.
3GPP TS 36.323 V14.4.0, "3rd Generation Partnership Project; Technical Specification Group Radio Access Network; Evolved Universal Terrestrial Radio Access (E-UTRA); Packet Data Convergence Protocol (PDCP) specification, (Release 14)", Sep. 2017.
3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification, (Release 14)", Sep. 2017.
3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP), (Release 14)", Sep. 2017.
3GPP TS 36.423 V14.4.0, "3rd Generation Partnership Project; Technical Specification Group Radio Access Network; Evolved Universal Terrestrial Radio Access Network (E-UTRAN); X2 application protocol (X2AP)", Sep. 2017.
3GPP TS 37.324 V1.1.1, "3rd Generation Partnership Project; Technical Specification Group Radio Access Network; E-UTRA and NR; Service Data Adaptation Protocol (SDAP) specification (Release 15)", Nov. 2017.

(56) References Cited

OTHER PUBLICATIONS

3GPP TS 37.340 V2.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TS 38.201 V2.0.0, "3rd Generation Partnership Project; Technical Specification Group Radio Access Network; NR; Physical layer; General description (Release 15)", Dec. 2017.

3GPP TS 38.202 V2.0.0, "3rd Generation Partnership Project; Technical Specification Group Radio Access Network; NR; Services provided by the physical layer (Release 15)", Dec. 2017.

3GPP TS 38.211 V2.0.0, "3rd Generation Partnership Project; Technical Specification Group Radio Access Network; NR; Physical channels and modulation (Release 15)", Dec. 2017.

3GPP TS 38.212 V1.2.1, "3rd Generation Partnership Project; Technical Specification Group Radio Access Network; NR; Multiplexing and channel coding (Release 15)", Dec. 2017.

3GPP TS 38.213 V2.0.0, "3rd Generation Partnership Project; Technical Specification Group Radio Access Network; NR; Physical layer procedures for control (Release 15)", Dec. 2017.

3GPP TS 38.214 V2.0.0, "3rd Generation Partnership Project; Technical Specification Group Radio Access Network; NR; Physical layer procedures for data (Release 15)", Dec. 2017.

3GPP TS 38.215 V2.0.0, "3rd Generation Partnership Project; Technical Specification Group Radio Access Network; NR; Physical layer measurements (Release 15)", Dec. 2017.

3GPP TS 38.300 V2.0.0, "3rd Generation Partnership Project; Technical Specification Group Radio Access Network; NR; NR and NG-RAN Overall Description; Stage 2 (Release 15)", Dec. 2017.

3GPP TS 38.321 V2.0.0, "3rd Generation Partnership Project; Technical Specification Group Radio Access Network; NR; Medium Access Control (MAC) protocol specification (Release 15)", Dec. 2017.

3GPP TS 38.322 V2.0.0, "3rd Generation Partnership Project; Technical Specification Group Radio Access Network; NR; Radio Link Control (RLC) protocol specification (Release 15)", Dec. 2017.

* cited by examiner

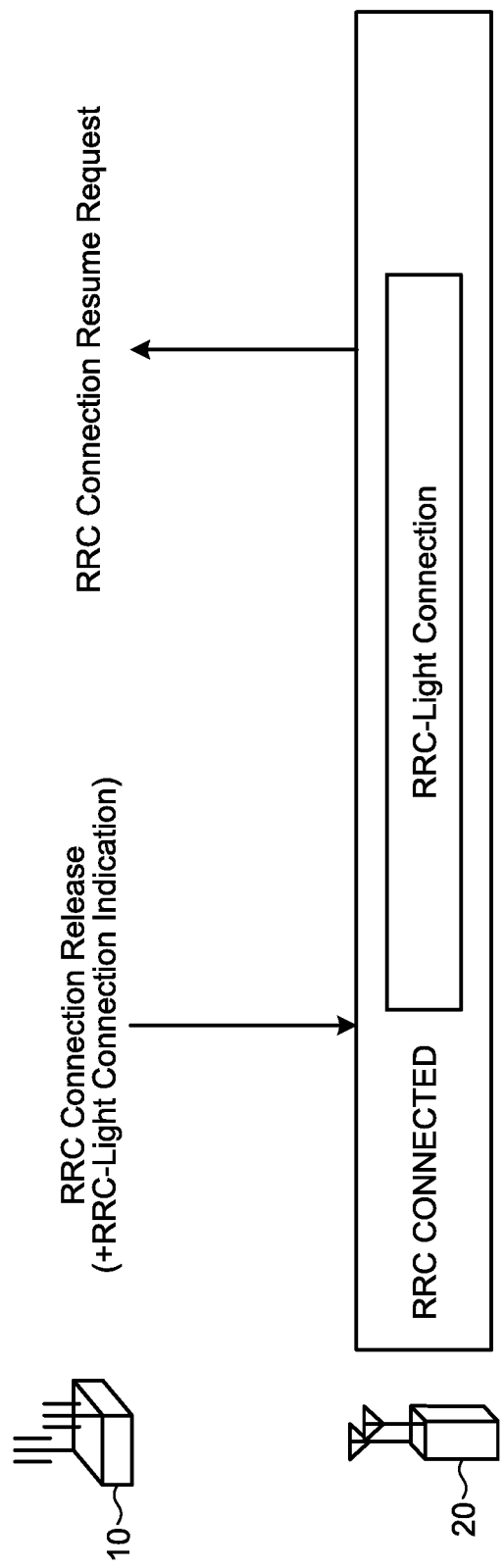

WIRELESS COMMUNICATION SYSTEM, BASE STATION, MOBILE STATION, AND METHOD OF WIRELESS COMMUNICATION

CROSS-REFERENCE TO RELATED APPLICATION

This application is a continuation application of International Application PCT/JP2018/010318, filed on Mar. 15, 2018 and designating the U.S., the entire contents of which are incorporated herein by reference.

FIELD

The present invention relates to a wireless communication system, a base station, a mobile station, and a method of wireless communication.

BACKGROUND

In current networks, the traffic of mobile terminals (smartphones, for example) occupies most of network resources. The traffic used by a mobile terminal (hereinafter, denoted as "a mobile station") tends to increase in the future.

Meanwhile, in accordance with development of Internet of Things (IoT) services (traffic systems, smart meters, and monitoring systems for apparatuses and the like, for example), it is demanded to deal with services having various requirements. Given these circumstances, in next generation (the 5th generation mobile communication (5G), for example) communication standards, it is demanded for technologies to achieve higher data rate, larger capacity, and lower latency are demanded in addition to the 4th generation mobile communication (4G) standard technologies (Non Patent Document 1 to 11, for example). The next generation communication standards are technically under study by working groups of 3rd Generation Partnership Project (3GPP) (TSG-RAN WG1, TSG-RAN WG2, and the like, for example) (Non Patent Document 12 to 40, for example).

5G supports various kinds of services. 5G assumes support of many use cases classified into enhanced Mobile Broadband (eMBB), massive Machine Type Communications (MTC), and Ultra-Reliable and Low Latency Communications (URLLC), for example. In 5G, employment of New Radio Access Technology (RAT) is under study as a new communication technique. New RAT is denoted as "NR." In Long Term Evolution (LTE), for example, a mobile station is called user equipment (UE), and a base station is called evolved Node B (eNB), whereas in NR, the base station is called 5G NB (a 5G base station) or gNB.

In a wireless communication system, Radio Resource Control (RRC) layer processing is executed. In the RRC layer processing, configuration, changing, releasing, and the like of connection between a wireless station (UE) and an opposite wireless station (gNB) are performed. In 3GPP, for example, an RRC connected mode and an RRC idle mode are specified as states of the RRC layer (Non Patent Document 9, for example). The RRC connected mode is a state in which data communication is able to be performed between the UE and the gNB, for example. The RRC idle mode is a state in which data communication is unable to be performed between the UE and the gNB, for example.

FIG. 12 is a schematic diagram of state transitions in NR. FIG. 12 is described in Non Patent Document 26 and 37, for example. As illustrated in FIG. 12, introduction of an RRC inactive mode ("NR RRC INACTIVE" in FIG. 12) between the RRC connected mode ("NR RRC CONNECTED" in FIG. 12) and the RRC idle mode ("NR RRC IDLE" in FIG. 12) is under study. Discussions about introduction of the RRC inactive mode have just begun (refer to "FFS (For Further Study) in FIG. 12). The RRC inactive mode is a mode that is to achieve low power consumption equivalently to the RRC connected mode and can quickly transit to the RRC connected mode at the time of data transmission.

The UE transmits and receives an RRC message as a message about the state transition to and from the gNB when transitioning from the RRC idle mode to the RRC connected mode, for example. In this case, information on data communication is informed to the gNB and stored thereby by a message transmitted from the UE. The information on data communication includes information on the position of the UE, communication capability, various kinds of parameters, and the identifier (terminal ID) of the UE.

The UE, in the RRC connected mode, transmits and receives a non-access stratum (NAS) message to and from the gNB. The gNB transmits an RRC message as a message about the state transition to the UE when causing the UE to transition from the RRC connected mode to the RRC inactive mode, for example.

The UE, in the RRC inactive mode, can resume the RRC connected mode by transmitting a resume request to the gNB at the time of occurrence of data, for example. The UE transitions to the RRC inactive mode, for example, whereby the information on data communication is stored by the gNB, and thus the UE does not have to inform the information on data communication to the gNB at the time of resumption of the RRC connected mode.

Non Patent Document 1: 3GPP TS36.211 V14.4.0, September 2017
Non Patent Document 2: 3GPP TS36.212 V14.4.0, September 2017
Non Patent Document 3: 3GPP TS36.213 V14.4.0, September 2017
Non Patent Document 4: 3GPP TS36.214 V14.4.0, September 2017
Non Patent Document 5: 3GPP TS36.300 V14.4.0, September 2017
Non Patent Document 6: 3GPP TS36.321 V14.4.0, September 2017
Non Patent Document 7: 3GPP TS36.322 V14.1.0, September 2017
Non Patent Document 8: 3GPP TS36.323 V14.4.0, September 2017
Non Patent Document 9: 3GPP TS36.331 V14.4.0, September 2017
Non Patent Document 10: 3GPP TS36.413 V14.4.0, September 2017
Non Patent Document 11: 3GPP TS36.423 V14.4.0, September 2017
Non Patent Document 12: 3GPP TS37.324 V1.1.1, November 2017
Non Patent Document 13: 3GPP TS37.340 V2.0.0, December 2017
Non Patent Document 14: 3GPP TS36.425 V14.0.0, March 2017
Non Patent Document 15: 3GPP TS38.201 V2.0.0, December 2017
Non Patent Document 16: 3GPP TS38.202 V2.0.0, December 2017
Non Patent Document 17: 3GPP TS38.211 V2.0.0, December 2017
Non Patent Document 18: 3GPP TS38.212 V1.2.1, December 2017

Non Patent Document 19: 3GPP TS38.213 V2.0.0, December 2017
Non Patent Document 20: 3GPP TS38.214 V2.0.0, December 2017
Non Patent Document 21: 3GPP TS38.215 V2.0.0, December 2017
Non Patent Document 22: 3GPP TS38.300 V2.0.0, December 2017
Non Patent Document 23: 3GPP TS38.321 V2.0.0, December 2017
Non Patent Document 24: 3GPP TS38.322 V2.0.0, December 2017
Non Patent Document 25: 3GPP TS38.323 V2.0.0, December 2017
Non Patent Document 26: 3GPP TS38.331 V0.4.0, December 2017
Non Patent Document 27: 3GPP TS38.401 V1.0.0, December 2017
Non Patent Document 28: 3GPP TS38.410 V0.6.0, December 2017
Non Patent Document 29: 3GPP TS38.413 V0.5.0, December 2017
Non Patent Document 30: 3GPP TS38.420 V0.5.0, December 2017
Non Patent Document 31: 3GPP TS38.423 V0.5.0, December 2017
Non Patent Document 32: 3GPP TS38.470 V1.0.0, December 2017
Non Patent Document 33: 3GPP TS38.473 V1.0.0, December 2017
Non Patent Document 34: 3GPP TR38.801 V14.0.0, April 2017
Non Patent Document 35: 3GPP TR38.802 V14.2.0, September 2017
Non Patent Document 36: 3GPP TR38.803 V14.2.0, September 2017
Non Patent Document 37: 3GPP TR38.804 V14.0.0, April 2017
Non Patent Document 38: 3GPP TR38.900 V14.3.1, July 2017
Non Patent Document 39: 3GPP TR38.912 V14.1.0, June 2017
Non Patent Document 40: 3GPP TR38.913 V14.3.0, June 2017
Non Patent Document 41: "New SID Proposal: Study on New Radio Access Technology", NTT Docomo, RP-160671, 3GPP TSG RAN Meeting #71 Goteborg, Sweden, 7-10 March, 2016

SUMMARY

According to an aspect of the embodiments, a base station includes: a memory; and a processor coupled to the memory and configured to: transmit, when a state transition of a mobile station is performed, a first control signal to the mobile station, and perform control to simultaneously transmit the first control signal and a second control signal different from the first control signal to the mobile station when a first state transition, which causes a state of the mobile station to transfer from a first state to a second state, is performed, and then a second state transition, which causes the state of the mobile station to transfer from the second state to a third state, is performed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is an illustrative diagram of a Radio Resource Control (RRC) light connection mode.

DESCRIPTION OF EMBODIMENTS

In 3GPP, discussions about introduction of the RRC inactive mode have just begun, and it has not been discussed so deeply. Thus, in 3GPP, when the RRC inactive mode is introduced, there is a possibility that some problems or malfunctions that have not been known in the world will occur. It is important whether a state transition delay can be reduced, for example. To reduce the state transition delay in particular, it is important to reduce the number of messages transmitted and received between the UE and the gNB. These have not been studied almost at all. Consequently, there have not been any methods that reduce the state transition delay as introduction of the RRC inactive mode.

In one aspect, the embodiments provide a wireless communication system, a base station, a mobile station, and a method of wireless communication capable of reducing the state transition delay.

The following describes embodiments of a wireless communication system, a mobile station, a base station, and a method of wireless communication disclosed by the present application in detail based on the accompanying drawings. The following embodiments do not limit the disclosed technology.

First Embodiment

[Wireless Communication System]

Figure 1:
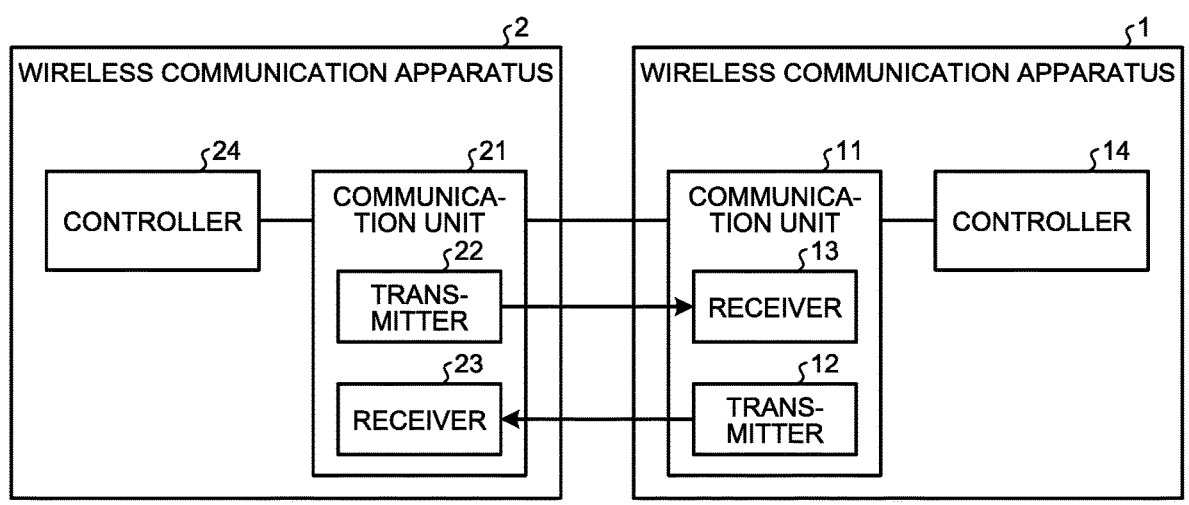
FIG. 1 is a block diagram of an exemplary configuration of a wireless communication system according to a first embodiment.

FIG. 1 is a block diagram of an exemplary configuration of a wireless communication system according to a first embodiment. As illustrated in FIG. 1, this wireless communication system according to the first embodiment has a wireless communication apparatus 1 and a wireless communication apparatus 2. The wireless communication apparatus 1 is an exemplary "first wireless communication apparatus," whereas the wireless communication apparatus 2 is an exemplary "second wireless communication apparatus.

The wireless communication apparatus 1 has a communication unit 11 and a controller 14.

The communication unit 11 performs wireless communication with the wireless communication apparatus 2. The communication unit 11 transmits and receives a control signal as a message to and from the wireless communication apparatus 2, for example.

Specifically, the communication unit 11 has a transmitter 12 and a receiver 13.

The transmitter 12, when a state transition of the wireless communication apparatus 2 is performed, transmits a first control signal as a message about the state transition to the wireless communication apparatus 2. The transmitter 12 transmits the first control signal to the wireless communication apparatus 2 when a first state transition, which causes the state of the wireless communication apparatus 2 to transfer from a first state to a second state, is performed, for example. The transmitter 12 transmits a second control signal as a message different from the first control signal to the wireless communication apparatus 2 when the state of the wireless communication apparatus 2 has transferred to the second state.

The receiver 13 receives the first control signal transmitted from the wireless communication apparatus 2 when the state transition of the wireless communication apparatus 2 is performed. The receiver 13 receives the first control signal transmitted from the wireless communication apparatus 2 when the first state transition is performed, for example. The receiver 13 receives the second control signal transmitted from the wireless communication apparatus 2 when the wireless communication apparatus 2 has transferred to the second state.

The controller 14 comprehensively controls operation of the wireless communication apparatus 1. The controller 14 performs control to transmit the first control signal and the second control signal simultaneously (piggybacked on each other) to the wireless communication apparatus 2 when the first state transition is performed, and then a second state transition, which causes the state of the wireless communication apparatus 2 to transfer from the second state to a third state, is performed.

The wireless communication apparatus 2 has a communication unit 21 and a controller 24.

The communication unit 21 performs wireless communication with the wireless communication apparatus 1. The communication unit 21 transmits and receives a control signal as a message to and from the wireless communication apparatus 1, for example.

Specifically, the communication unit 21 has a transmitter 22 and a receiver 23.

The transmitter 22 transmits the first control signal to the wireless communication apparatus 1 when the state transition of the wireless communication apparatus 2 is performed. The transmitter 22 transmits the first control signal to the wireless communication apparatus 1 when the first state transition is performed, for example. The transmitter 22 transmits the second control signal to the wireless communication apparatus 1 when the state of the wireless communication apparatus 2 has transferred to the second state.

The receiver 23 receives the first control signal transmitted from the wireless communication apparatus 1 when the state transition of the wireless communication apparatus 2 is performed. The receiver 23 receives the first control signal transmitted from the wireless communication apparatus 1 when the first state transition is performed, for example. The receiver 23 receives the second control signal transmitted from the wireless communication apparatus 1 when the state of the wireless communication apparatus 2 has transferred to the second state.

The controller 24 comprehensively controls operation of the wireless communication apparatus 2. The controller 24 performs control to simultaneously receive the first control signal and the second control signal from the wireless communication apparatus 1 when the first state transition is performed, and then the second state transition is performed.

According to the foregoing description, in the wireless communication system according to the first embodiment, the communication unit 11 of the wireless communication apparatus 1 transmits the first control signal to the wireless communication apparatus 2 when the state transition of the wireless communication apparatus 2 is performed. The first control signal is a message about the state transition. First, the communication unit 11 of the wireless communication apparatus 1 performs the first state transition, which causes the state of the wireless communication apparatus 2 to transition from the first state to the second state. Subsequently, the controller 14 of the wireless communication apparatus 1 performs control to transmit a third control signal to the wireless communication apparatus 2 when the second state transition, which causes the state of the wireless communication apparatus 2 to transition from the second state to the third state, is performed. The third control signal is a control signal transmitted simultaneously with the first control signal and the second control signal (piggybacked thereon), for example. The second control signal is a message different from the first control signal. In 3GPP, when an RRC inactive mode is introduced, there is a possibility that some problems or malfunctions that have not been known in the world will occur. It is important whether a state transition delay can be reduced, for example. To reduce the state transition delay in particular, it is important to reduce the number of messages transmitted and received between user equipment (UE) and a g Node B (gNB). Therefore, in the wireless communication system according to the first embodiment, the wireless communication apparatus 1 simultaneously transmits the first and second control signals as messages to the wireless communication apparatus 2 and can thereby reduce the state transition delay.

Second Embodiment

[Wireless Communication System]

Figure 2:
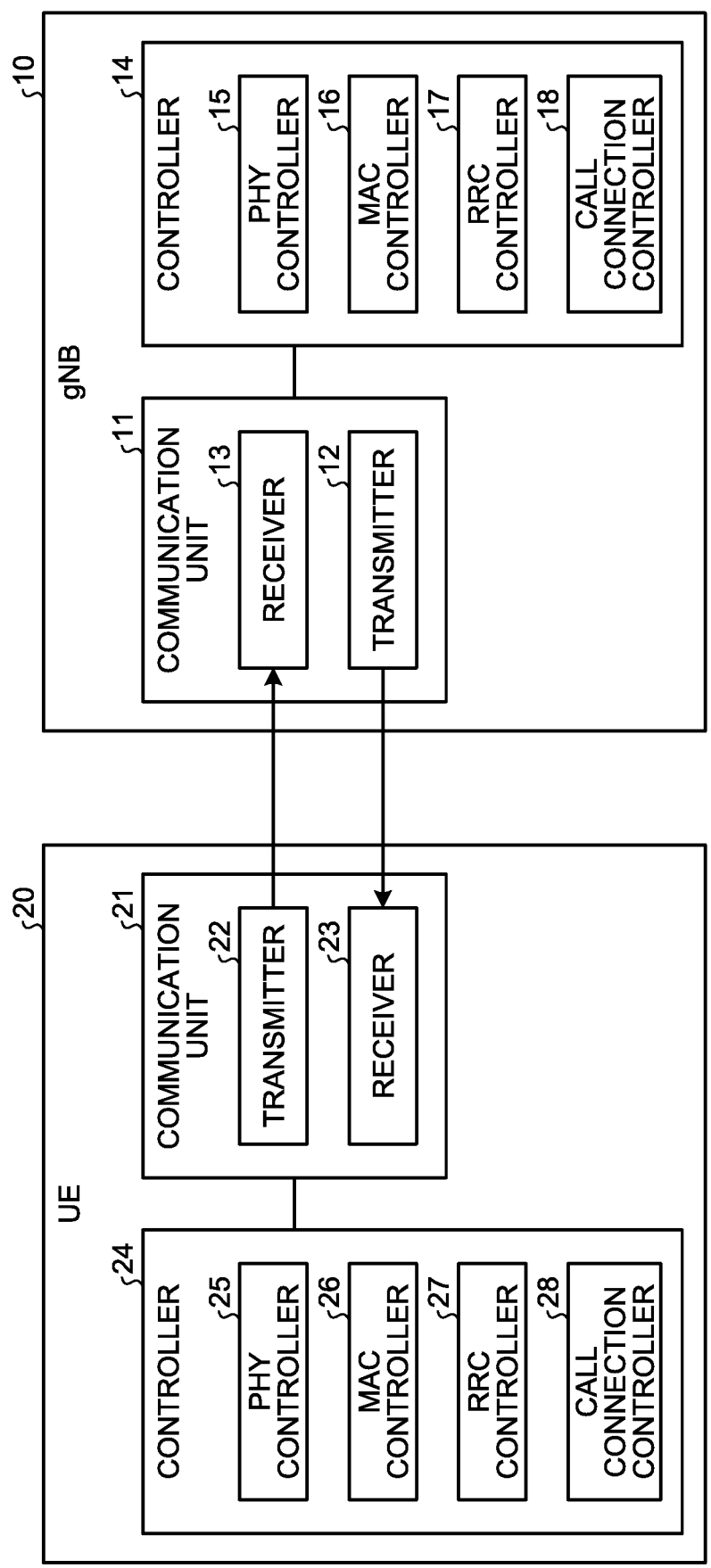
FIG. 2 is a block diagram of an exemplary configuration of a wireless communication system according to a second embodiment.

The following describes a second embodiment. FIG. 2 is a block diagram of an exemplary configuration of a wireless communication system according to the second embodiment. As illustrated in FIG. 2, this wireless communication system according to the second embodiment has a base station 10 as the wireless communication apparatus 1 in FIG. 1. The wireless communication system according to the second embodiment has a mobile station 20 as the wireless communication apparatus 2 in FIG. 1. In the following, the mobile station 20 is denoted as "the UE 20" as a terminal, whereas the base station 10 is denoted as "the gNB 10." In the second embodiment, the same parts as those of the first embodiment are denoted by the same symbols, and descriptions thereof are omitted. The second embodiment can be combined with the first embodiment to the extent that the processing details do not conflict with each other.

[gNB 10]

The communication unit 11 performs wireless communication with the UE 20. The controller 14 comprehensively controls operation of the gNB 10.

Specifically, the controller 14 is a processing unit processing a baseband signal, for example, and includes a physical (PHY) controller 15, a medium access control (MAC) controller 16, a radio resource control (RRC) controller 17, and a call connection controller 18.

The PHY controller 15 processes signals when wireless transmission is performed. The PHY controller 15 determines a modulation coding scheme for wireless signals, for example. The MAC controller 16 performs processing about data scheduling.

The RRC controller 17 controls operation of the gNB 10. The RRC controller 17 performs setting of wireless resource parameters for use in communication (call setting, for example) and communication state management of the gNB 10, for example. The RRC controller 17 performs handover processing for connecting the UE 20 to an appropriate gNB.

The RRC controller 17 controls the communication unit 11 so as to transmit and receive messages to and from the UE 20.

The RRC controller 17 controls the communication unit 11 so as to transmit and receive an RRC message to and from the UE 20 when performing the first state transition, which causes the state of the UE 20 to transit from an RRC idle mode to an RRC connected mode, for example. The RRC idle mode is an exemplary "first state," whereas the RRC connected mode is an exemplary "second state." The RRC message is an exemplary "first control signal."

The RRC controller 17 controls the communication unit 11 so as to transmit and receive a Non-Access Stratum (NAS) message to and from the UE 20 in the RRC connected mode, for example. The NAS message is an exemplary "second control signal."

The RRC controller 17 controls the communication unit 11 so as to simultaneously transmit the RRC message and the NAS message to the UE 20 when the second state transition, which causes the state of the UE 20 to transit from the RRC connected mode to an RRC inactive mode, is performed, for example. The RRC inactive mode is an exemplary "third state." Simultaneous transmission of the RRC message and the NAS message will be described in Solution described below.

The call connection controller 18 determines the type and traffic type of the UE 20 and, based on a determination result, controls management of an RRC state by the RRC controller 17.

[UE 20]

The communication unit 21 performs wireless communication with the gNB 10. The controller 24 comprehensively controls operation of the communication unit 21.

Specifically, the controller 24 is a processing unit processing a baseband signal, for example, and includes a PHY controller 25, a MAC controller 26, an RRC controller 27, and a call connection controller 28.

The PHY controller 25 processes signals when wireless transmission is performed. The PHY controller 25 performs wireless transmission in accordance with the modulation coding scheme for wireless signals informed by the gNB 10, for example. The MAC controller 26 performs processing about data scheduling based on wireless resources and timing indicated by the gNB 10.

The RRC controller 27 controls operation of the UE 20. The RRC controller 27 performs configuration of wireless resource parameters for use in communication (call setting, for example) and communication state management of the UE 20, for example. The RRC controller 27 performs handover processing for connecting to an appropriate gNB 10.

The RRC controller 27 controls the communication unit 21 to transmit and receive messages to and from the gNB 10.

The RRC controller 27 controls the communication unit 21 so as to transmit and receive the RRC message to and from the gNB 10 when the first state transition, which causes the state of the UE 20 to transfer from the RRC idle mode to the RRC connected mode, is performed, for example.

The RRC controller 27 controls the communication unit 21 so as to transmit and receive the NAS message to and from the gNB 10 in the RRC connected mode, for example.

The RRC controller 27 controls the communication unit 21 so as to simultaneously receive the RRC message and the NAS message from the gNB 10 when the second state transition, which causes the state of the UE 20 to transfer from the RRC connected mode to the RRC inactive mode, is performed, for example. Simultaneous reception of the RRC message and the NAS message transmitted from the gNB 10 will be described in Solution described below.

The call connection controller 28 controls management of an RRC state by the RRC controller 27 in accordance with the type and traffic type of the UE 20.

[State Transition]

Figure 3:
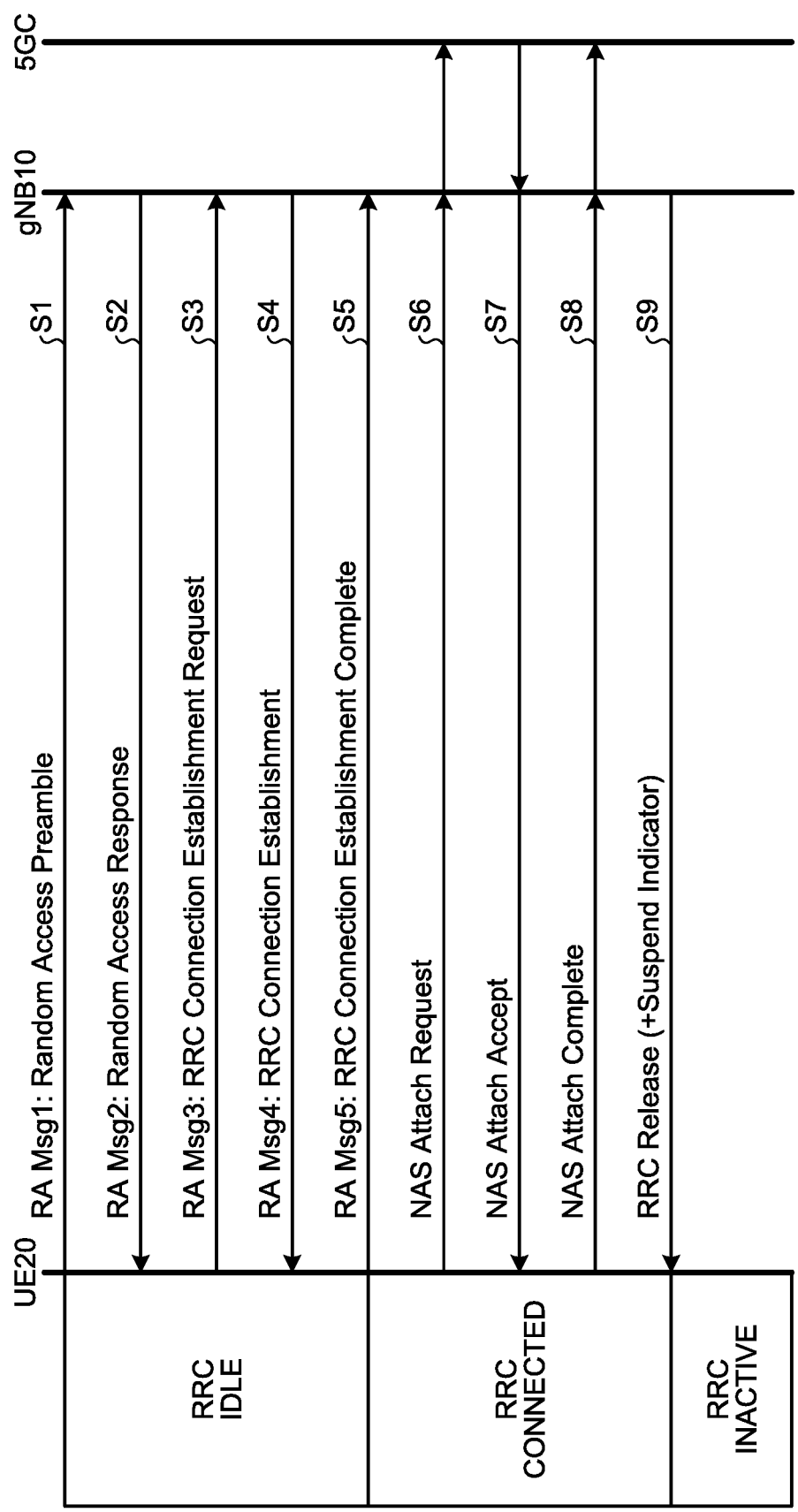
FIG. 3 is a sequential diagram of exemplary state transitions.

The following describes a case in which the gNB 10 causes the state of the UE 20 to transition to the RRC inactive mode "RRC INACTIVE" at the time of configuration of data communication. FIG. 3 is a sequential diagram of exemplary state transitions.

First, in the RRC idle mode "RRC IDLE," the UE 20 transmits "Random Access Preamble" as a message RA Msg1 to the gNB 10 (Step S1). The gNB 10 receives the message RA Msg1 "Random Access Preamble" transmitted from the UE 20.

The gNB 10 transmits "Random Access Response" as a message RA Msg2 to the UE 20 in response to the received message RA Msg1 "Random Access Preamble" (Step S2). The UE 20 receives the message RA Msg2 "Random Access Response" transmitted from the gNB 10.

Next, the UE 20 transmits "RRC Connection Establishment Request" as a message RA Msg3 (RRC message) to the gNB 10 (Step S3). The gNB 10 receives the message RA Msg3 "RRC Connection Establishment Request" transmitted from the UE 20.

The message RA Msg3 "RRC Connection Establishment Request" includes information on data communication. The information on data communication includes information on the position of the UE, communication capability, various kinds of parameters, and the identifier (terminal ID) of the UE. The gNB 10 stores the information on data communication. Then, the gNB 10 recognizes which UE 20 has been connected by the stored information on data communication and transmits "RRC Connection Establishment" as a message RA Msg4 (RRC message) to the UE 20 (Step S4). The UE 20 receives the message RA Msg4 "RRC Connection Establishment" transmitted from the gNB 10.

Next, the UE 20 transmits "RRC Connection Establishment Complete" as a message RA Msg5 (RRC message) to the gNB 10 in response to the received message RA Msg4

"RRC Connection Establishment" (Step S5). Then, the UE 20 transfers from the RRC idle mode "RRC IDLE" to the RRC connected mode "RRC CONNECTED."

In the RRC connected mode "RRC CONNECTED," the UE 20 transmits "NAS Attach Request" as an NAS message to the gNB 10 (Step S6). The gNB 10 receives the NAS message "NAS Attach Request" transmitted from the UE 20 and transmits the NAS message "NAS Attach Request" to a 5th generation (5G) core network (hereinafter, denoted as "the 5GC").

Next, the gNB 10 receives "NAS Attach Accept" as an NAS message from the 5GC and transmits the NAS message "NAS Attach Accept" to the UE 20 (Step S7). The UE 20 receives the NAS message "NAS Attach Accept" transmitted from the gNB 10.

Next, the UE 20 transmits "NAS Attach Complete" as an NAS message to the gNB 10 (Step S8). The gNB 10 receives the NAS message "NAS Attach Complete" transmitted from the UE 20 and transmits the NAS message "NAS Attach Complete" to the 5GC.

Then, the gNB 10 causes the state of the UE 20 to transfers from the RRC connected mode "RRC CONNECTED" to the RRC inactive mode "RRC INACTIVE." In this case, in 3GPP, a technique applying a sub mode of the RRC connected mode may be used, for example.

The sub mode of the RRC connected mode is described in Non Patent Document 5 and 9 using "Cell selection/Cell reselection," "Paging Monitoring," or the like, for example. In the following, the sub mode of the RRC connected mode is denoted as "the RRC-light connection mode." FIG. 13 is an illustrative diagram of the RRC light connection mode. Originally, the gNB 10 transmits "RRC Connection Release" as an RRC message to the UE 20 when the state of the UE 20 is caused to transfer from the RRC connected mode to the RRC idle mode. As an application of this, the gNB 10 transmits an RRC message "RRC Connection Release" including indication information "RRC-Light Connection indication" to the UE 20 when the state of the UE 20 is caused to transfer from the RRC connected mode to the RRC light connection mode. In this case, the UE 20 transfers from the RRC connected mode to the RRC light connection mode in response to the indication information "RRC-Light Connection indication" included in the RRC message "RRC Connection Release." The UE 20, in the RRC light connection mode, can resume the RRC connected mode by transmitting a resume request "RRC Connection Resume Request" to the gNB 10 at the time of occurrence of data, for example.

Similarly, also for the example illustrated in FIG. 3, the gNB 10 causes the state of the UE 20 to transfer from the RRC connected mode "RRC CONNECTED" to the RRC inactive mode "RRC INACTIVE" by the application technique described above. Specifically, in this case, the gNB 10 transmits an RRC message "RRC Release" including indication information "Suspend Indicator" to the UE 20 (Step S9). The indication information "Suspend Indicator" is information indicating the transition to the RRC inactive mode. The UE 20 receives the RRC message "RRC Release" including the indication information "Suspend Indicator" from the gNB 10. The UE 20 transfers from the RRC connected mode to the RRC inactive mode in response to the indication information "Suspend Indicator" included in the received RRC message "RRC Release." The UE 20, in the RRC inactive mode, can resume the RRC connected mode by transmitting a resumption request "Resume Request" (not illustrated) to the gNB 10 at the time of occurrence of data, for example.

The UE 20 transfers to the RRC inactive mode, for example, whereby the information on data communication is stored by the gNB 10, and thus the UE 20 does not have to inform the information on data communication to the gNB 10 at the time of resumption of the RRC connected mode.

[Problem]

The following describes a problem when the RRC inactive mode is introduced. Note that this problem has newly been found out by the inventor of the present invention after studying introduction of the RRC inactive mode and has not conventionally been known.

When the RRC inactive mode is introduced, it is important whether the state transition delay can be reduced, for example. However, in the state transitions described above, many messages are transmitted and received between the UE 20 and the gNB 10. Specifically, in FIG. 3, the number of messages transmitted and received is nine. To reduce the state transition delay, it is important to reduce the number of messages transmitted and received between the UE 20 and the gNB 10.

[Solution]

Given these circumstances, in the wireless communication system according to the second embodiment, the gNB 10 simultaneously transmits the RRC message and the NAS massage to the UE 20 when the state of the UE 20 is caused to transfer from the RRC connected mode to the RRC inactive mode. The following describes this point with reference to a specific example.

Figure 4:
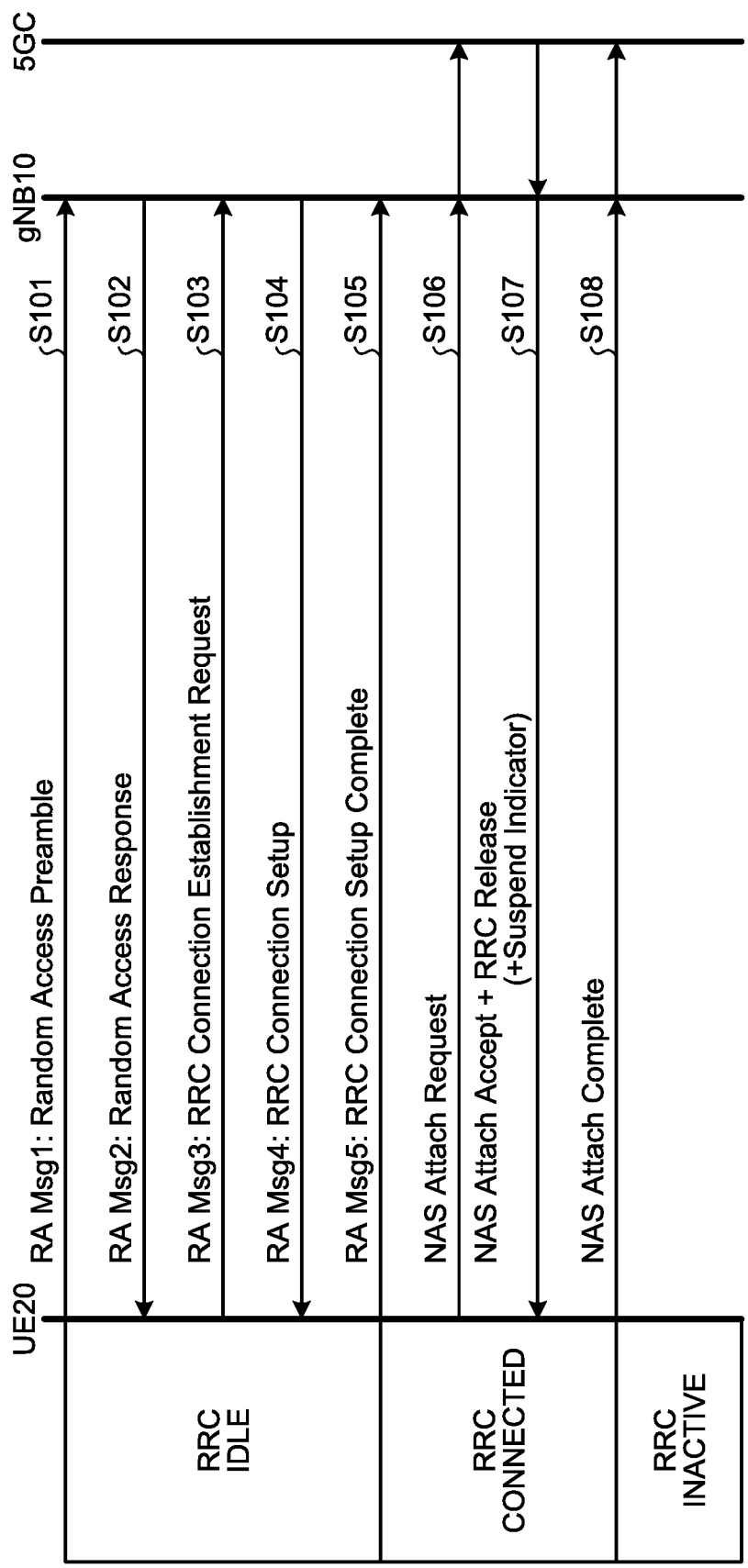
FIG. 4 is a sequential diagram of exemplary operation (state transitions) of the wireless communication system according to the second embodiment.

FIG. 4 is a sequential diagram of exemplary operation (state transitions) of the wireless communication system according to the second embodiment.

First, in the RRC idle mode "RRC IDLE," the UE 20 transmits "Random Access Preamble" as the message RA Msg1 to the gNB 10 (Step S101). The gNB 10 receives the message RA Msg1 "Random Access Preamble" transmitted from the UE 20.

The gNB 10 transmits "Random Access Response" as the message RA Msg2 to the UE 20 in response to the received message RA Msg1 "Random Access Preamble" (Step S102). The UE 20 receives the message RA Msg2 "Random Access Response" transmitted from the gNB 10.

Next, the UE 20 transmits "RRC Connection Establishment Request" as the message RA Msg3 (RRC message) including information on data communication to the gNB 10 (Step S103). The gNB 10 receives the message RA Msg3 "RRC Connection Establishment Request" including the information on data communication transmitted from the UE 20.

The gNB 10 stores the information on data communication included in the message RA Msg3 "RRC Connection Establishment Request." Then, the gNB 10 recognizes which UE 20 has been connected by the stored information on data communication and transmits "RRC Connection Setup" as the message RA Msg4 (RRC message) to the UE 20 (Step S104). The UE 20 receives the message RA Msg4 "RRC Connection Setup" transmitted from the gNB 10.

Next, the UE 20 transmits "RRC Connection Setup Complete" as the message RA Msg5 (RRC message) to the gNB 10 in response to the received message RA Msg4 "RRC Connection Setup" (Step S105). Then, the UE 20 transfers from the RRC idle mode "RRC IDLE" to the RRC connected mode "RRC CONNECTED."

In the RRC connected mode "RRC CONNECTED," the UE 20 transmits "NAS Attach Request" as the NAS message to the gNB 10 (Step S106). The gNB 10 receives the NAS message "NAS Attach Request" transmitted from the UE 20 and transmits the NAS message "NAS Attach Request" to the 5GC.

The gNB 10 receives "NAS Attach Accept" as the NAS message from the 5GC. Then, the gNB 10 simultaneously transmits the RRC message "RRC Release" including the indication information "Suspend Indicator" and the NAS message "NAS Attach Accept" to the UE 20 (Step S107).

There is a need to verify whether the gNB 10 can simultaneously transmit the RRC message "RRC Release" and the NAS message "NAS Attach Accept" to the UE 20. Section 4.2.2 of Non Patent Document 9 states that the piggyback of the NAS message in a downlink is used only for "bearer establishment," "modification," and "release," for example. More specifically, it is specified that these are used only for procedures on which the states of NAS and AS depend. That is to say, in the present embodiment, there is a possibility that the gNB 10 is not able to transmit the RRC message "RRC Release" carried on the NAS message "NAS Attach Accept" to the UE 20. This is because "NAS Attach Accept" is a message that makes the state of NAS a connected state, whereas "RRC Release" is a message that makes the state of AS a released state, which are different from each other. Consequently, to enable the messages to simultaneously be transmitted, specifications such as "state transition" and "power saving" may be needed, for example.

Next, the UE 20 simultaneously receives the RRC message "RRC Release" including the indication information "Suspend Indicator" and the NAS message "NAS Attach Request" from the gNB 10. In this case, the UE 20 transmits "NAS Attach Complete" as the NAS message to the gNB 10 (Step S108). The gNB 10 receives the NAS message "NAS Attach Complete" from the UE 20 and transmits the NAS message "NAS Attach Complete" to the 5GC. The UE 20 transitions from the RRC connected mode "RRC CONNECTED" to the RRC inactive mode "RRC INACTIVE" based on the indication information "Suspend Indicator."

The UE 20, in the RRC inactive mode "RRC INACTIVE," can resume the RRC connected mode "RRC CONNECTED" by transmitting the resume request "Resume Request" (not illustrated) to the gNB 10 at the time of occurrence of data, for example. The UE 20 transfers to the RRC inactive mode, for example, whereby the information on data communication is stored by the gNB 10, and thus the UE 20 does not have to inform the information on data communication to the gNB 10 at the time of resumption of the RRC connected mode.

According to the foregoing description, in the wireless communication system according to the second embodiment, the communication unit 11 of the gNB 10 transmits the RRC message to the UE 20 when the state transition of the UE 20 is performed. First, the communication unit 11 of the gNB 10 transmits the RRC message to the UE 20 when the first state transition, which causes the state of the UE 20 to transfer from the RRC idle mode "RRC IDLE" to the RRC connected mode "RRC CONNECTED," is performed. Subsequently, the controller 14 of the gNB 10 performs control to simultaneously transmit the RRC message and the NAS message to the UE 20 when the second state transition, which causes the state of the UE 20 to transfer from the RRC connected mode to the RRC inactive mode "RRC INACTIVE", is performed. The RRC message transmitted simultaneously with the NAS message in the second state transition includes the indication information "Suspend Indicator" indicating the transition to the RRC inactive mode. In the wireless communication system according to the second embodiment, the gNB 10 transmits the RRC message including the indication information "Suspend Indicator" and the NAS message simultaneously (piggybacked on each other) to the UE 20, whereby the state transition delay is reduced. Consequently, the wireless communication system according to the second embodiment can reduce the state transition delay.

Third Embodiment

In the second embodiment, whether the indication information "Suspend Indicator" is added to the RRC message is determined by the gNB 10. In this case, the UE 20 transfers from the RRC connected mode to the RRC inactive mode upon reception of the indication information "Suspend Indicator" from the gNB 10. However, this is not limiting. In a third embodiment, for example, the UE 20 requests the indication information "Suspend Indicator" from the gNB 10 and transfers from the RRC connected mode to the RRC inactive mode upon reception of the indication information "Suspend Indicator" responsive to the request from the gNB 10. The third embodiment can thereby reduce the state transition delay and besides achieve power saving for the UE 20. In the third embodiment, the same parts as those of the second embodiment are denoted by the same symbols, and descriptions thereof are omitted. The third embodiment can be combined with the first embodiment to the extent that the processing details do not conflict with each other.

Figure 5:
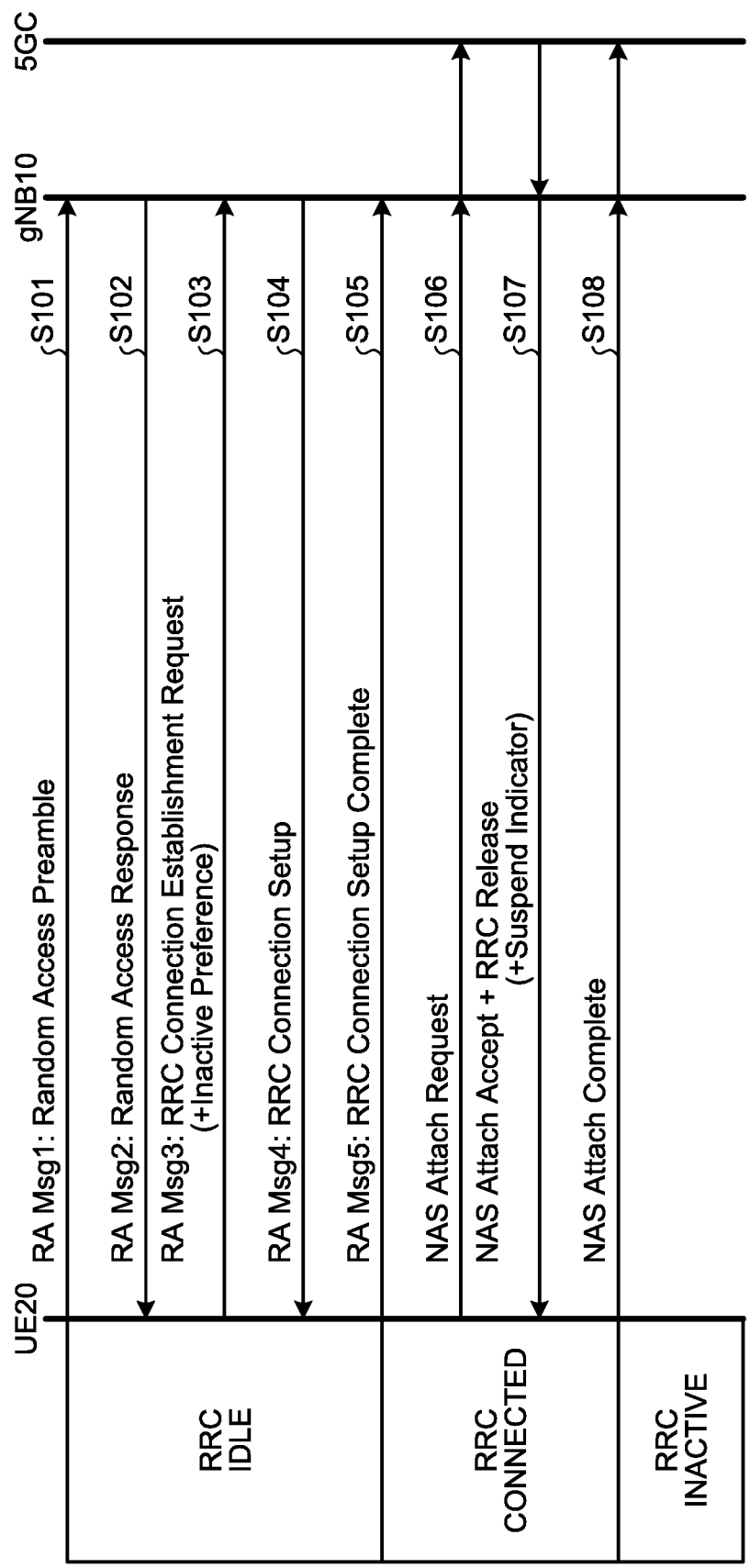
FIG. 5 is a sequential diagram of exemplary operation (state transitions) of a wireless communication system according to a third embodiment.

FIG. 5 is a sequential diagram of exemplary operation (state transitions) of a wireless communication system according to the third embodiment.

First, Steps S101 and S102 described above are executed.

Next, the UE 20 transmits the message RA Msg3 "RRC Connection Establishment Request" including the information on data communication and request information "Inactive Preference" to the gNB 10 (Step S103). The request information "Inactive Preference" is information for requesting the indication information "Suspend Indicator" from the gNB 10. The gNB 10 receives the message RA Msg3 "RRC Connection Establishment Request" from the UE 20. The gNB 10 stores the information on data communication and the request information "Inactive Preference" included in the received message RA Msg3 "RRC Connection Establishment Request."

Next, Steps S104 to S106 described above are executed.

The gNB 10 receives the NAS message "NAS Attach Accept" from the 5GC. Then, the gNB 10 simultaneously transmits the RRC message "RRC Release" including the indication information "Suspend Indicator" and the NAS message "NAS Attach Accept" to the UE 20 based on the stored request information "Inactive Preference" (Step S107).

Subsequently, Step S108 described above is executed.

The gNB 10 can add the request information "Inactive Preference" to the message RA Msg3 "RRC Connection Establishment Request." The message RA Msg3 is transmitted from the UE 20 by a physical uplink shared channel (PUSCH), for example. Given these circumstances, in 5G, reducing the number of bits of cyclic redundancy checking (CRC) to be added to the message RA Msg3 (PUSCH) from 24 bits to 8 to 16 bits, for example, is being considered. When the number of bits of CRC is reduced, it is easy to add the request information "Inactive Preference" to its free space.

Although the UE 20 adds the request information "Inactive Preference" to the message RA Msg3 "RRC Connection Establishment Request" in the third embodiment, this is not limiting. The UE 20 may add the request information "Inactive Preference" to the message RA Msg5 "RRC Connection Setup Complete," for example.

According to the foregoing description, in the wireless communication system according to the third embodiment, the communication unit 11 of the gNB 10 transmits the RRC message to the UE 20 when the state transition of the UE 20 is performed. First, the communication unit 11 of the gNB 10 transmits the RRC message to the UE 20 when the first state transition, which causes the state of the UE 20 to transfer from the RRC idle mode "RRC IDLE" to the RRC connected mode "RRC CONNECTED," is performed. Subsequently, the controller 14 of the gNB 10 performs control to simultaneously transmit the RRC message and the NAS message to the UE 20 when the second state transition, which causes the state of the UE 20 to transition from the RRC connected mode to the RRC inactive mode "RRC INACTIVE," is performed. The RRC message transmitted simultaneously with the NAS message in the second state transition includes the indication information "Suspend Indicator" indicating the transition to the RRC inactive mode. In the wireless communication system according to the third embodiment, the gNB 10 simultaneously transmits the RRC message including the indication information "Suspend Indicator" and the NAS message to the UE 20, whereby the state transition delay is reduced by at least by 10 ms. Consequently, the wireless communication system according to the third embodiment can reduce the state transition delay.

In the wireless communication system according to the third embodiment, the communication unit 11 of the gNB 10 receives, from the UE 20, the RRC message including the request information "Inactive Preference" requesting the indication information "Suspend Indicator" in the first state transition. In this case, the controller 14 of the gNB 10 performs control to simultaneously transmit the RRC message including the indication information "Suspend Indicator" and the NAS message to the UE 20 based on the request information "Inactive Preference" in the second state transition. Thus, the UE 20 requests the indication information "Suspend Indicator" from the gNB 10 and transitions from the RRC connected mode to the RRC inactive mode upon reception of the indication information "Suspend Indicator" responsive to the request from the gNB 10. The wireless communication system according to the third embodiment can thereby reduce the state transition delay and besides achieve power saving for the UE 20.

Fourth Embodiment

Although the RRC message "RRC Release" transmitted simultaneously with the NAS message "NAS Attach Accept" includes "Suspend Indicator" as the indication information in the third embodiment, this is not limiting. The RRC message "RRC Release" transmitted simultaneously with the NAS message "NAS Attach Accept" may include a flag as the indication information, for example. In the fourth embodiment, the same parts as those of the third embodiment are denoted by the same symbols, and descriptions thereof are omitted. The fourth embodiment can be combined with the first embodiment to the extent that the processing details do not conflict with each other.

Figure 6:
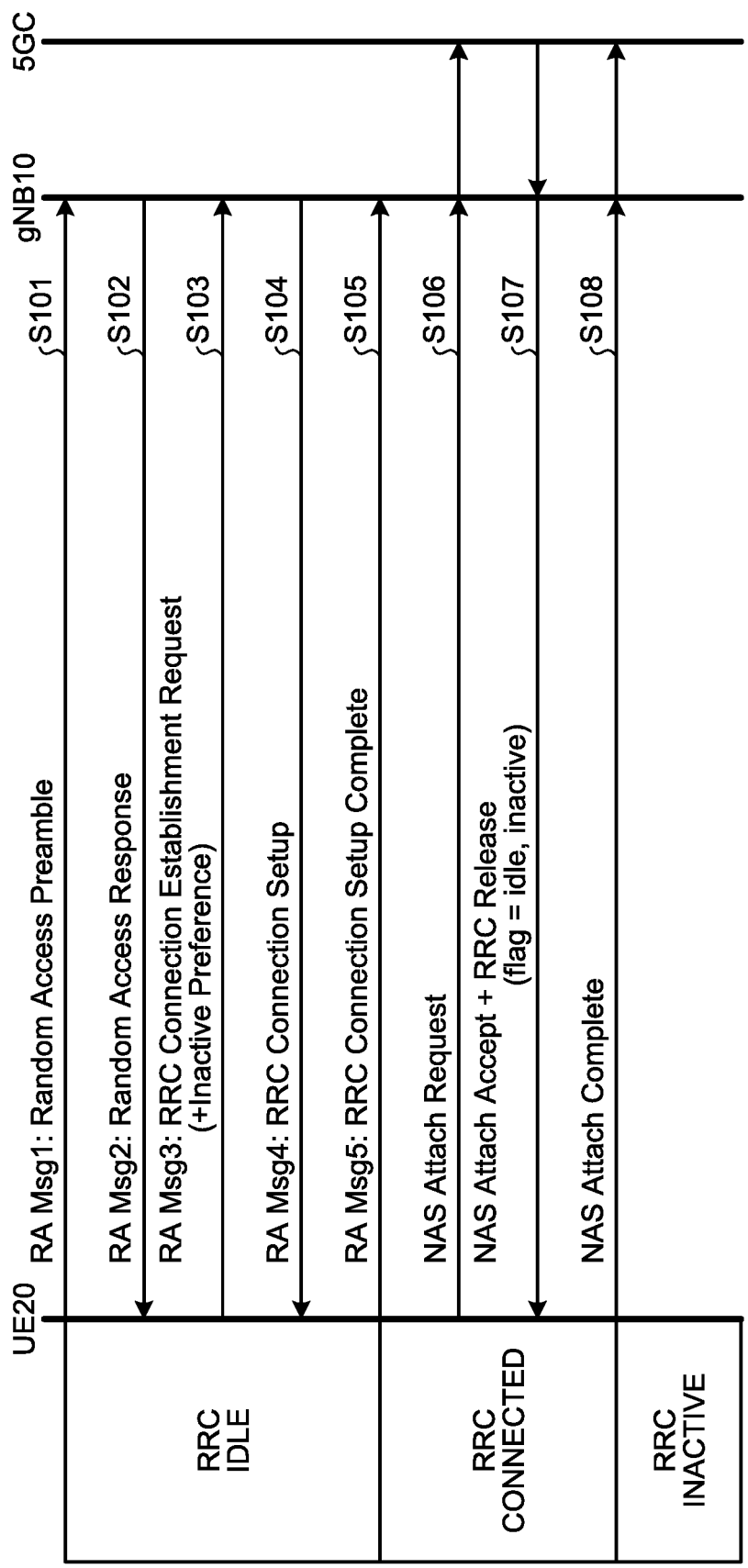
FIG. 6 is a sequential diagram of exemplary operation (state transitions) of a wireless communication system according to a fourth embodiment.

FIG. 6 is a sequential diagram of exemplary operation (state transitions) of a wireless communication system according to the fourth embodiment.

First, Steps S101 to S106 described above are executed.

The gNB 10 receives the NAS message "NAS Attach Accept" from the 5GC. Then, the gNB 10 simultaneously transmits the RRC message "RRC Release" including "flag" as the indication information and the NAS message "NAS Attach Accept" to the UE 20 based on the stored request information "Inactive Preference" (Step S107). The indication information "flag" represents information "idle" indicating a transition to the RRC idle mode "RRC IDLE" or information "inactive" indicating a transition to the RRC inactive mode "RRC INACTIVE."

Subsequently, Step S108 described above is executed.

According to the foregoing description, in the wireless communication system according to the fourth embodiment, the communication unit 11 of the gNB 10 receives, from the UE 20, the RRC message including the request information "Inactive Preference" requesting the indication information "Suspend Indicator" in the first state transition. In this case, the controller 14 of the gNB 10 performs control to simultaneously transmit the RRC message including the indication information "flag" and the NAS message to the UE 20 based on the request information "Inactive Preference" in the second state transition. Thus, the UE 20 requests the indication information "flag" from the gNB 10 and transitions from the RRC connected mode to the RRC inactive mode upon reception of the indication information "flag" responsive to the request from the gNB 10. The wireless communication system according to the fourth embodiment can thereby reduce the state transition delay and besides achieve power saving for the UE 20 like the third embodiment.

Figure 7:
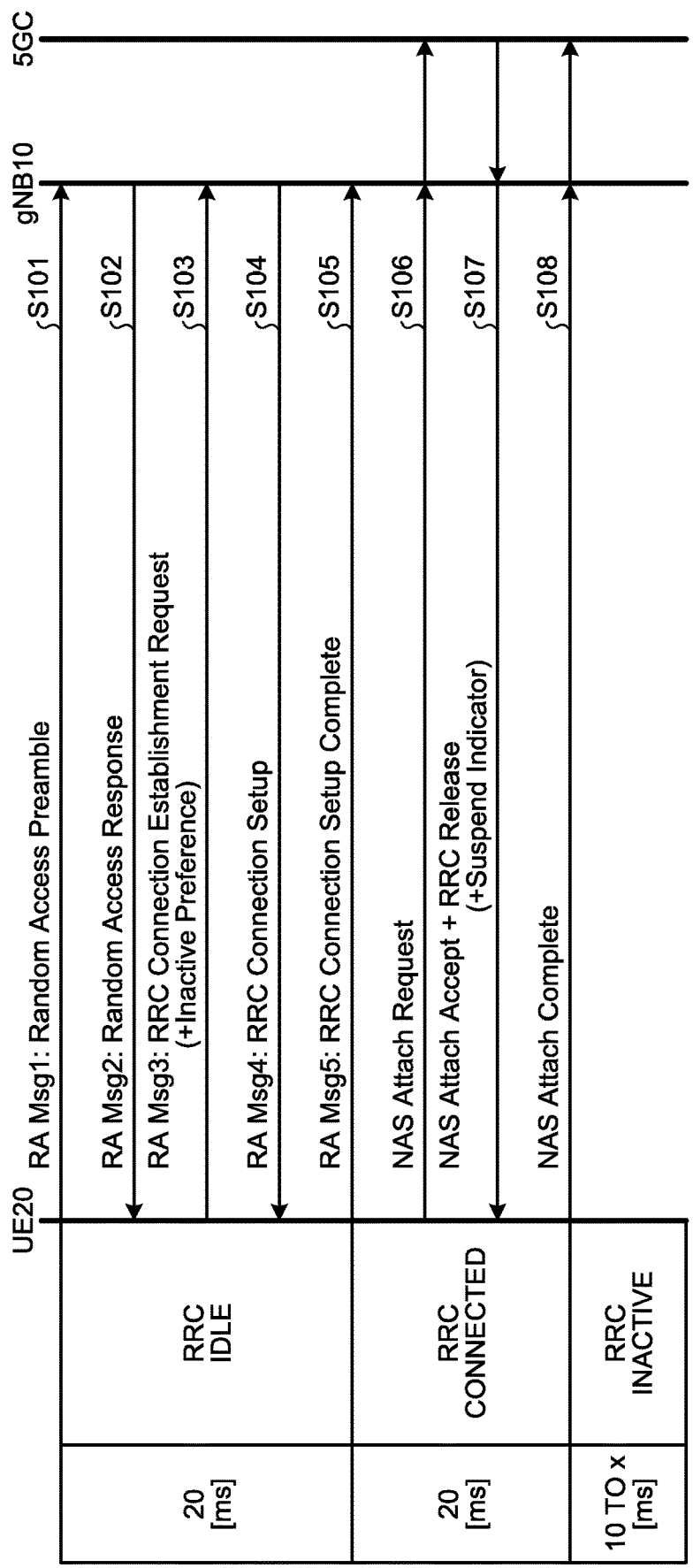
FIG. 7 is an illustrative diagram of an effect of the wireless communication system according to the present embodiment.
Figure 8:
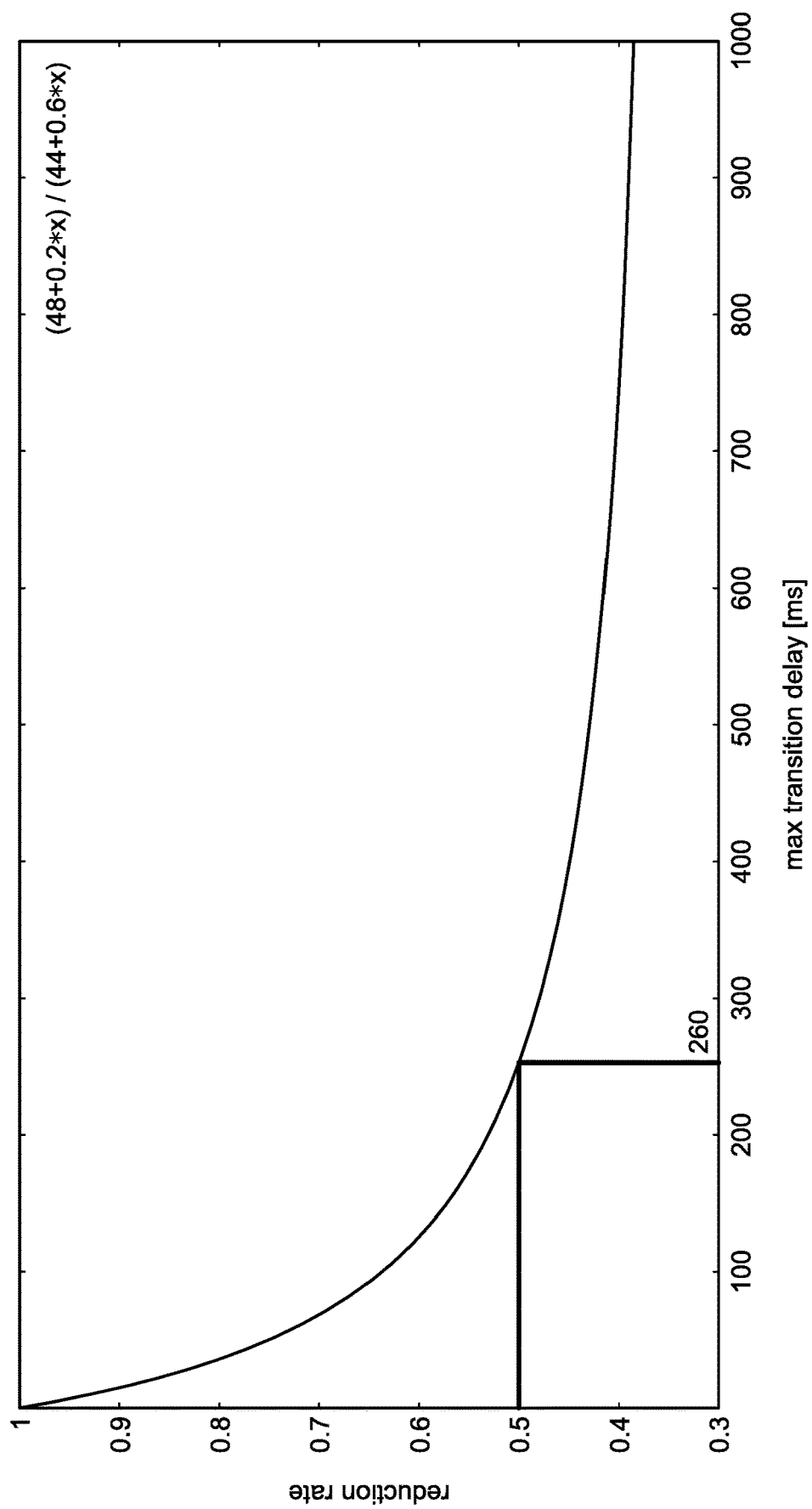
FIG. 8 is an illustrative diagram of the effect of the wireless communication system according to the present embodiment.

The following specifically describes a reduction in the state transition delay with reference to the third embodiment, for example, as the effect of the wireless communication systems according to the second to fourth embodiments. FIG. 7 and FIG. 8 are illustrative diagrams of the effect of the wireless communication system according to the present embodiment.

In FIG. 7, a needed time of the RRC idle mode "RRC IDLE" is set to 20 [ms], whereas a needed time of the RRC connected mode "RRC CONNECTED" is set to 20 [ms], for example. A delay time when the UE 20 transitions to the RRC inactive mode "RRC INACTIVE" when the gNB 10 adds the indication information "Suspend Indicator" to the RRC message "RRC Release" is set to 10 [ms]. A delay time when the UE 20 transitions to the RRC inactive mode "RRC INACTIVE" when the gNB 10 does not add the indication information "Suspend Indicator" to the RRC message "RRC Release" is set to x [ms].

In the example illustrated in FIG. 3, a probability of the gNB 10 adding the indication information "Suspend Indicator" to the RRC message "RRC Release" is set to 0.4. In this case, a needed time $f(x)$ from the RRC idle mode to the RRC inactive mode is represented by $f(x)=20+20+(0.4\times10+(1-0.4)\times x)=44+0.6\times x$.

In the present embodiment, a probability of the gNB 10 adding the indication information "Suspend Indicator" to the RRC message "RRC Release" is set to 0.8. In this case, a needed time $g(x)$ from the RRC idle mode to the RRC inactive mode is represented by $g(x)=20+20+(0.8\times10+(1-0.8)\times x)=48+0.2\times x$.

In FIG. 8, the horizontal axis represents maximum transition delay time, that is, delay time x [ms], whereas the vertical axis represents reduction rate. The reduction rate is represented by $g(x)/f(x)$. As illustrated in FIG. 8, a longer delay time x gives a lower reduction rate. When the delay time x is 260 [ms], the reduction rate is 0.5, for example.

[Modification]

In the second to fourth embodiments, the gNB 10 causes the state of the UE 20 to transfer to the RRC inactive mode "RRC INACTIVE" at the time of configuration of data communication. In the third and fourth embodiments, for example, the UE 20 requests the indication information "Suspend Indicator" from the gNB 10 and transitions to the RRC inactive mode upon reception of the indication information "Suspend Indicator" from the gNB 10 at the time of setting of data communication. As a modification of the example illustrated in FIG. 3, the UE 20 may transfer to the RRC inactive mode upon reception of the indication information "Suspend Indicator" from the gNB 10 at the time of end of data communication.

Figure 9:
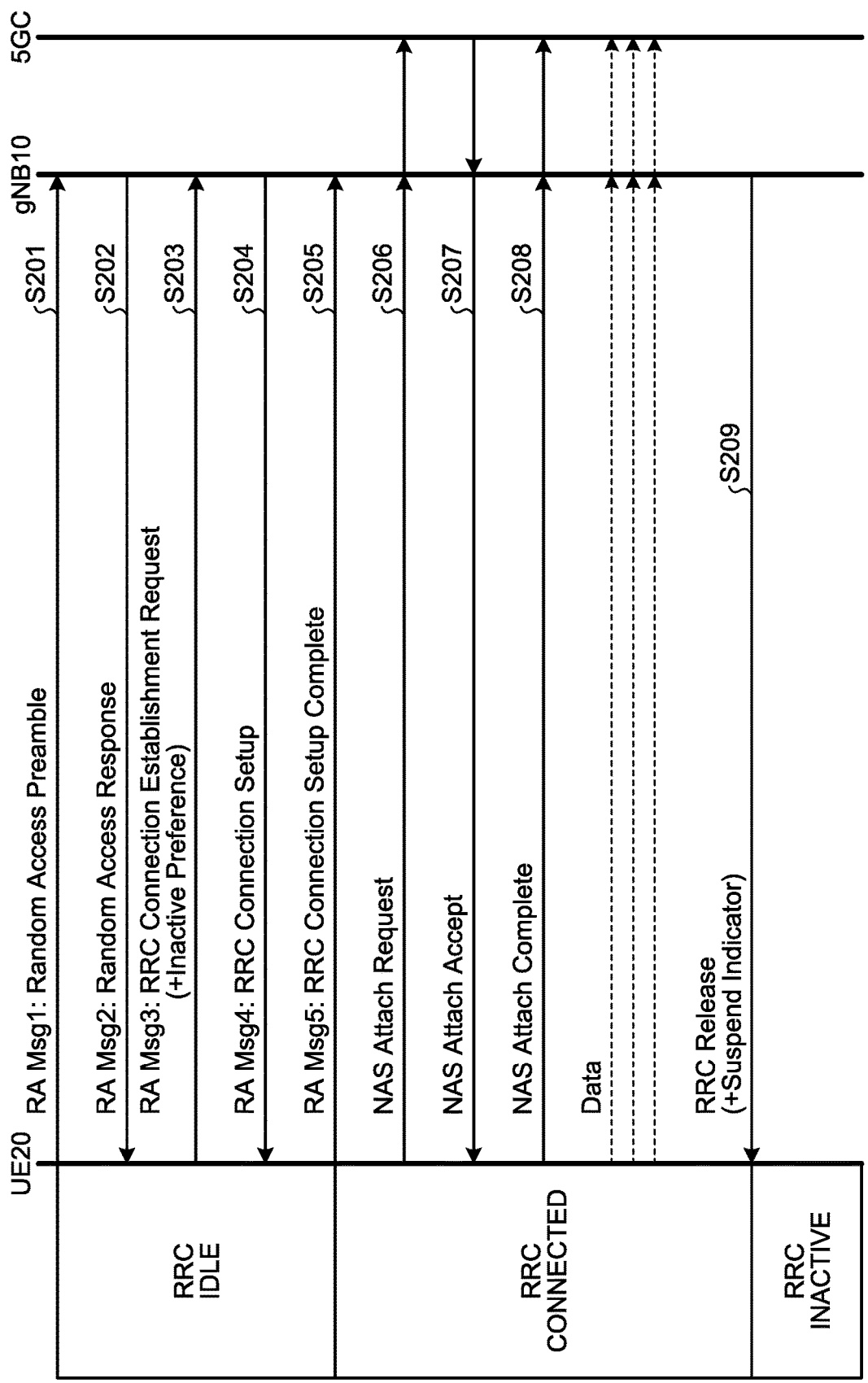
FIG. 9 is a sequential diagram of exemplary operation (state transitions) of a wireless communication system according to a modification.

FIG. 9 is a sequential diagram of exemplary operation (state transitions) of a wireless communication system according to the modification.

First, in the RRC idle mode "RRC IDLE," the UE 20 transmits the message RA Msg1 "Random Access Preamble" to the gNB 10 (Step S201). The gNB 10 receives the message RA Msg1 "Random Access Preamble" transmitted from the UE 20.

The gNB 10 transmits the message RA Msg2 "Random Access Response" to the UE 20 in response to the received message RA Msg1 "Random Access Preamble" (Step S202). The UE 20 receives the message RA Msg2 "Random Access Response" transmitted from the gNB 10.

Next, the UE 20 transmits the message RA Msg3 "RRC Connection Establishment Request" including the information on data communication and the request information "Inactive Preference" to the gNB 10 (Step S203). The gNB 10 receives the message RA Msg3 "RRC Connection Establishment Request" from the UE 20. The gNB 10 stores the information on data communication and the request information "Inactive Preference" included in the received message RA Msg3 "RRC Connection Establishment Request."

The gNB 10 recognizes which UE 20 has been connected by the stored information on data communication and transmits the message RA Msg4 "RRC Connection Setup" to the UE 20 (Step S204). The UE 20 receives the message RA Msg4 "RRC Connection Setup" transmitted from the gNB 10.

Next, the UE 20 transmits the message RA Msg5 "RRC Connection Setup Complete" to the gNB 10 in response to the received message RA Msg4 "RRC Connection Setup" (Step S205). Then, the UE 20 transitions from the RRC idle mode "RRC IDLE" to the RRC connected mode "RRC CONNECTED."

In the RRC connected mode "RRC CONNECTED," the UE 20 transmits the NAS message "NAS Attach Request" to the gNB 10 (Step S206). The gNB 10 receives the NAS message "NAS Attach Request" transmitted from the UE 20 and transmits the NAS message "NAS Attach Request" to the 5GC.

Next, the gNB 10 receives the NAS message "NAS Attach Accept" from the 5GC and transmits the NAS message "NAS Attach Accept" to the UE 20 (Step S207). The UE 20 receives the NAS message "NAS Attach Accept" transmitted from the gNB 10.

Next, the UE 20 transmits "NAS Attach Complete" as the NAS message to the gNB 10 (Step S208). The gNB 10 receives the NAS message "NAS Attach Complete" transmitted from the UE 20 and transmits the NAS message "NAS Attach Complete" to the 5GC.

Next, the UE 20 performs data communication with the gNB 10 (refer to "Data" in FIG. 9).

At the time of end of data communication, the gNB 10 transmits the RRC message "RRC Release" including the indication information "Suspend Indicator" to the UE 20 based on the stored request information "Inactive Preference" (Step S209). The UE 20 receives the RRC message "RRC Release" including the indication information "Suspend Indicator" from the gNB 10. The UE 20 transfers from the RRC connected mode to the RRC inactive mode in response to the indication information "Suspend Indicator" included in the received RRC message "RRC Release."

Thus, in the modification, the UE 20 requests the indication information "Suspend Indicator" from the gNB 10 at the time of configuration of data communication, and the UE 20 transfers to the RRC inactive mode upon reception of the indication information "Suspend Indicator" from the gNB 10 at the time of end of data communication. The medication can thereby achieve more power saving for the UE 20 than the example illustrated in FIG. 3.

Other Embodiments

The components in the embodiments are not necessarily needed to be physically configured as illustrated. That is to say, specific modes of distribution and consolidation of the parts are not limited to those illustrated, and the whole or part thereof can be configured by functionally or physically distributing or consolidating any units in accordance with various kinds of loads or use conditions.

Further, the whole or any part of various kinds of processing performed by the apparatuses may be executed on a central processing unit (CPU) (or a microcomputer such as a micro processing unit (MPU) or a micro controller unit (MCU)). The whole or any part of the various kinds of processing may be executed on a computer program analytically executed on the CPU (or the microcomputer such as the MPU or the MCU) or on hardware by a wired logic.

The gNB 10 and the UE 20 of the embodiments can be implemented by the following hardware configuration, for example.

Figure 10:
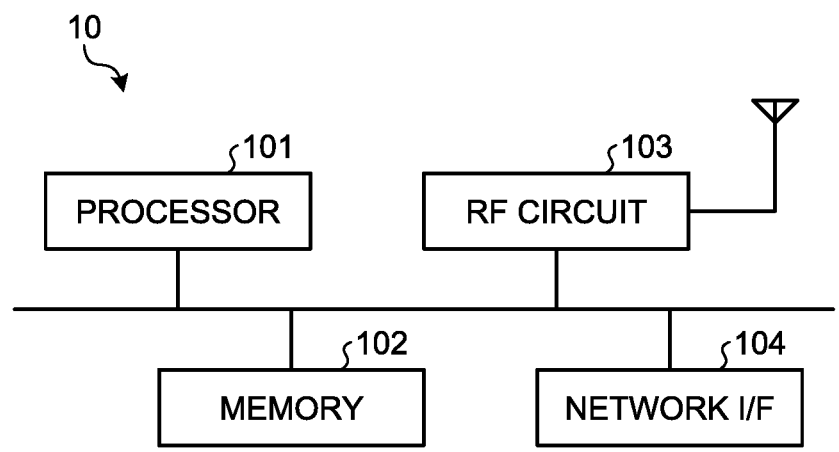
FIG. 10 is a block diagram of an exemplary hardware configuration of a g Node B (gNB)

FIG. 10 is a block diagram of an exemplary hardware configuration of the gNB 10. The gNB 10 has a processor 101, a memory 102, a radio frequency (RF) circuit 103, and a network interface (IF) 104, for example. Examples of the processor 101 include the CPU, a digital signal processor (DSP), and a field programmable gate array (FPGA). Examples of the memory 102 include a random access memory (RAM) such as a synchronous dynamic random access memory (SDRAM), a read only memory (ROM), and a flash memory.

The various kinds of processing performed by the gNB 10 of the embodiments may be implemented by executing computer programs stored in various kinds of memories such as a non-volatile storage medium by the processor 101. That is to say, the memory 102 may store therein computer programs corresponding to respective pieces of processing executed by respective components, and the processor 101 may execute the computer programs. The respective components correspond to the functions of the controller 14. The communication unit 11 is implemented by the RF circuit 103.

Although one processor 101 executes the various kinds of processing performed by the gNB 10 of the embodiments, this is not limiting; a plurality of processors may execute them.

Figure 11:
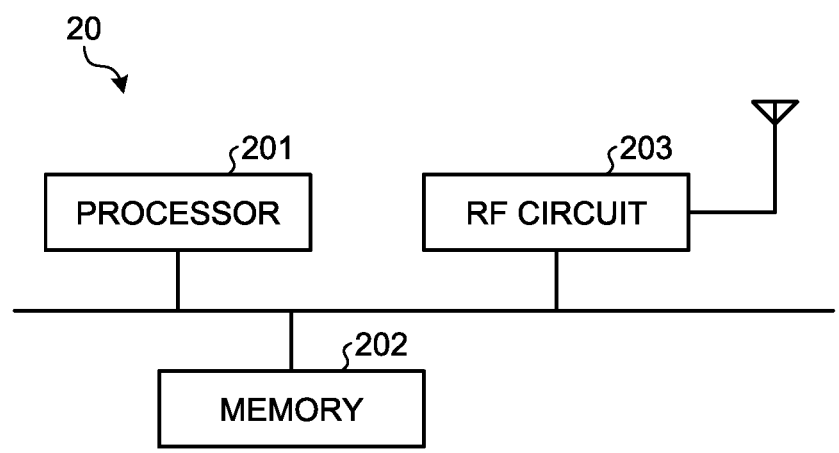
FIG. 11 is a block diagram of an exemplary hardware configuration of user equipment (UE)
Figure 12:
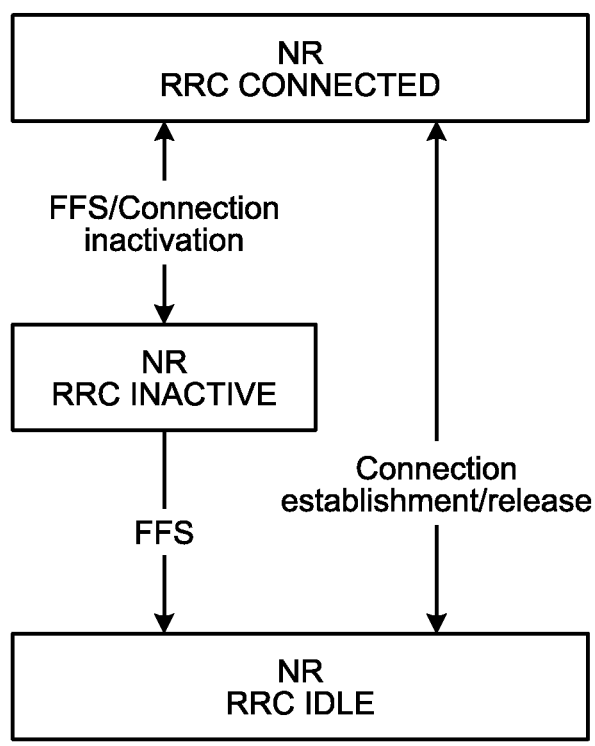
FIG. 12 is a schematic diagram of state transitions in New Radio Access Technology (RAT) (NR)

FIG. 11 is a diagram of an exemplary hardware configuration of the UE 20. The UE 20 has a processor 201, a memory 202, and an RF circuit 203. Examples of the processor 201 include the CPU, the DSP, and the FPGA. Examples of the memory 202 include the RAM such as the SDRAM, the ROM, and the flash memory.

The various kinds of processing performed by the UE 20 of the embodiments may be implemented by executing computer programs stored in various kinds of memories such as a non-volatile storage medium by the processor 201. That is to say, the memory 202 may store therein computer programs corresponding to respective pieces of processing executed by respective components, and the processor 201 may execute the computer programs. The respective components correspond to the functions of the controller 24. The communication unit 21 is implemented by the RF circuit 203.

Although one processor 201 executes the various kinds of processing performed by the UE 20 of the embodiments, this is not limiting; a plurality of processors may execute them.

One aspect can reduce a state transition delay.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
   a memory; and
   a processor coupled to the memory and configured to:
      transmit, when a state transition of a mobile station, which causes a state of the mobile station to transfer from a first state to a second state, is performed, a first message of a first control signal to the mobile station, the first control signal controlling a communication between the mobile station and the base station, and
      simultaneously transmit, when a second state transition, which causes the state of the mobile station to transfer from the second state to a third state, is performed, a second message of the first control signal and a third message of a second control signal different from the first control signal to the mobile station, the second control signal controlling a communication between the mobile station and a core network.

2. The base station according to claim 1, wherein the second message transmitted simultaneously with the third message in the second state transition includes indication information indicating a transition to the third state.

3. The base station according to claim 2, wherein the processor is further configured to:
   receive, from the mobile station, the first message including request information requesting the indication information in the first state transition, and
   simultaneously transmit the second message including the indication information and the third message to the mobile station based on the request information in the second state transition.

4. The base station according to claim 1, wherein the first control signal is a Radio Resource Control (RRC) message, and
the second control signal is a Non-Access Startum (NAS) message.

5. The base station according to claim 1, wherein the first state is a RRC IDLE state,
the second state is a RRC CONNECTED state, and
the third state is a RRC INACTIVE state.

6. A mobile station comprising:
   a memory; and
   a processor coupled to the memory and configured to:
      receive a first message of a first control signal, which causes a state of the mobile station to transfer from a first state to a second state, from a base station when a state transition is performed, the first control signal controlling a communication between the mobile station and the base station, and
      simultaneously receive, when a second state transition, which causes the state of the mobile station to transfer from the second state to a third state, is performed, a second message of the first control signal and a third message of a second control signal different from the first control signal from the base station, the second control signal controlling a communication between the mobile station and a core network.

7. The mobile station according to claim 6, wherein the first control signal is a Radio Resource Control (RRC) message, and
the second control signal is a Non-Access Startum (NAS) message.

8. A wireless communication system comprising a first wireless communication apparatus and a second wireless communication apparatus,
   the first wireless communication apparatus including:
      a memory; and
      a processor coupled to the memory and configured to:
         transmit a first message of a first control signal to the second wireless communication apparatus when a state transition of the second wireless communication apparatus, which causes a state of the second wireless communication apparatus to transfer from a first state to a second state, is performed, the first control signal controlling a communication between the first wireless communication apparatus and the second wireless communication apparatus, and
         simultaneously transmit, when a second state transition, which causes the state of the second wireless communication apparatus to transfer from the second state to a third state, is performed, a second message of the first control signal and a third message of a second control signal different from the first control signal to the second wireless communication apparatus, the second control signal controlling a communication between the second wireless communication apparatus and a core network.

9. The wireless communication system according to claim 8, wherein
the first control signal is a Radio Resource Control (RRC) message, and
the second control signal is a Non-Access Startum (NAS) message.

10. A method of wireless communication executed by a wireless communication system including a first wireless communication apparatus and a second wireless communication apparatus, the method comprising:
   transmitting a first message of a first control signal to the second wireless communication apparatus, which causes a state of the second wireless communication apparatus to transfer from a first state to a second state, when a state transition of the second wireless communication apparatus is performed, by the first wireless communication apparatus; the first control signal controlling a communication between the first wireless communication apparatus and the second wireless communication apparatus, and simultaneously transmitting, when a second state transition, which causes the state of the second wireless communication apparatus to transfer from the second state to a third state, is performed, a second message of the first control signal and a third message of a second control signal different from the first control signal to the second wireless communication apparatus, the second control signal controlling a communication between the second wireless communication apparatus and a core network.

11. The method of wireless communication according to claim 10, wherein the first control signal is a Radio Resource Control (RRC) message, and the second control signal is a Non-Access Startum (NAS) message.

\* \* \* \* \*